(12) United States Patent
Takahashi

(10) Patent No.: US 9,197,787 B2
(45) Date of Patent: Nov. 24, 2015

(54) IMAGE READING DEVICE, IMAGE FORMING APPARATUS, AND IMAGE READING METHOD

(71) Applicant: KYOCERA Document Solutions Inc., Osaka-shi, Osaka (JP)

(72) Inventor: Masayoshi Takahashi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/527,643

(22) Filed: Oct. 29, 2014

(65) Prior Publication Data

US 2015/0116797 A1  Apr. 30, 2015

(30) Foreign Application Priority Data

Oct. 31, 2013 (JP) ................................. 2013-227400

(51) Int. Cl.
*H04N 1/04* (2006.01)
*H04N 1/48* (2006.01)
*H04N 1/028* (2006.01)
*H04N 1/10* (2006.01)

(52) U.S. Cl.
CPC ........... *H04N 1/484* (2013.01); *H04N 1/02815* (2013.01); *H04N 1/10* (2013.01); *H04N 2201/0081* (2013.01); *H04N 2201/0094* (2013.01)

(58) Field of Classification Search
CPC ..... H04N 1/484; H04N 1/02815; H04N 1/10; H04N 2201/0081; H04N 2201/0094
USPC ................................... 358/1.9, 509, 505, 474
See application file for complete search history.

(56) References Cited

U.S. PATENT DOCUMENTS

| 4,658,289 A | * | 4/1987 | Nagano et al. ................ 358/509 |
| 5,914,486 A | * | 6/1999 | Yamamoto .................... 250/226 |
| 6,937,361 B1 | | 8/2005 | Kondo et al. |
| 2002/0030837 A1 | * | 3/2002 | Hokoi ............................ 358/1.9 |
| 2006/0061835 A1 | | 3/2006 | Inada |

FOREIGN PATENT DOCUMENTS

| JP | 08009258 A | 1/1996 |
| JP | 2000152008 A | 5/2000 |
| JP | 2006093820 A | 4/2006 |

* cited by examiner

*Primary Examiner* — Houshang Safaipour
(74) *Attorney, Agent, or Firm* — Alleman Hall McCoy Russell & Tuttle LLP

(57) ABSTRACT

An image reading device includes a light source, a photoelectric conversion portion, a first radiation control portion, and a first image generating portion. The light source radiates lights of R (red), G (green), and B (blue). The photoelectric conversion portion receives light reflected from a document and outputs an electric signal corresponding to a light reception amount. The first radiation control portion sequentially radiates two color lights of G and R or B from the light source to each line along a main scanning direction on the document while alternately switching the lights of R and B on a line-by-line basis. The first image generating portion generates color image data for one line, based on at least three electric signals corresponding to lights of R, G, and B among the electric signals corresponding to respective color lights radiated to at least adjacent two lines by the first radiation control portion.

5 Claims, 5 Drawing Sheets

IMAGE READING DEVICE, IMAGE FORMING APPARATUS, AND IMAGE READING METHOD

INCORPORATION BY REFERENCE

This application is based upon and claims the benefit of priority from the corresponding Japanese Patent Application No. 2013-227400 filed on Oct. 31, 2013, the entire contents of which are incorporated herein by reference.

BACKGROUND

The present disclosure relates to an image reading device for reading color image data from a document.

Generally, there is known an image reading device capable of reading color image data from a document by sequentially switching the color of light radiated from a light source and receiving, by a line sensor, light corresponding to each color light, that has been reflected from the document.

SUMMARY

An image reading device according to one aspect of the present disclosure includes a light source, a photoelectric conversion portion, a first radiation control portion, and a first image generating portion. The light source is configured to radiate lights of R (red), G (green), and B (blue). The photoelectric conversion portion is configured to receive light reflected from a document and output an electric signal corresponding to a light reception amount. The first radiation control portion is configured to sequentially radiate lights in two colors of G and R or B from the light source to each line along a main scanning direction on the document while alternately switching the light of R and the light of B on a line-by-line basis. The first image generating portion is configured to generate color image data for one line, based on at least three electric signals corresponding to lights of R, G, and B among the electric signals corresponding to lights in respective colors radiated to at least adjacent two lines by the first radiation control portion.

An image forming apparatus according to another aspect of the present disclosure includes an image reading device and an image forming portion. The image forming portion is configured to form an image based on image data read by the image reading device.

An image reading method according to another aspect of the present disclosure is an image reading method executed by an image reading device that includes a light source configured to radiate lights of R (red), G (green), and B (blue), and a photoelectric conversion portion configured to receive light reflected from a document and output an electric signal corresponding to a light reception amount, the image reading method including the following first and second steps. In the first step, lights in two colors of G and R or B are sequentially radiated from the light source to each line along a main scanning direction on the document while the light of R and the light of B are alternately switched on a line-by-line basis. In the second step, color image data for one line is generated based on at least three electric signals corresponding to lights of R, G, and B among the electric signals corresponding to lights in respective colors radiated to at least adjacent two lines in the first step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for understanding of the present disclosure. It is noted that the following embodiments are merely examples in which the present disclosure is embodied, and do not limit the technical scope of the present disclosure.

[Schematic Configuration of Image Forming Apparatus 10]

First, with reference to FIG. 1 to FIG. 3, the schematic configuration of an image forming apparatus 10 according to an embodiment of the present disclosure will be described. Here, FIG. 2A is a schematic sectional view of an ADF 1 and an image reading portion 2 of the image forming apparatus 10, and FIG. 2B is a C-C arrow view of FIG. 2A.

Figure 1:
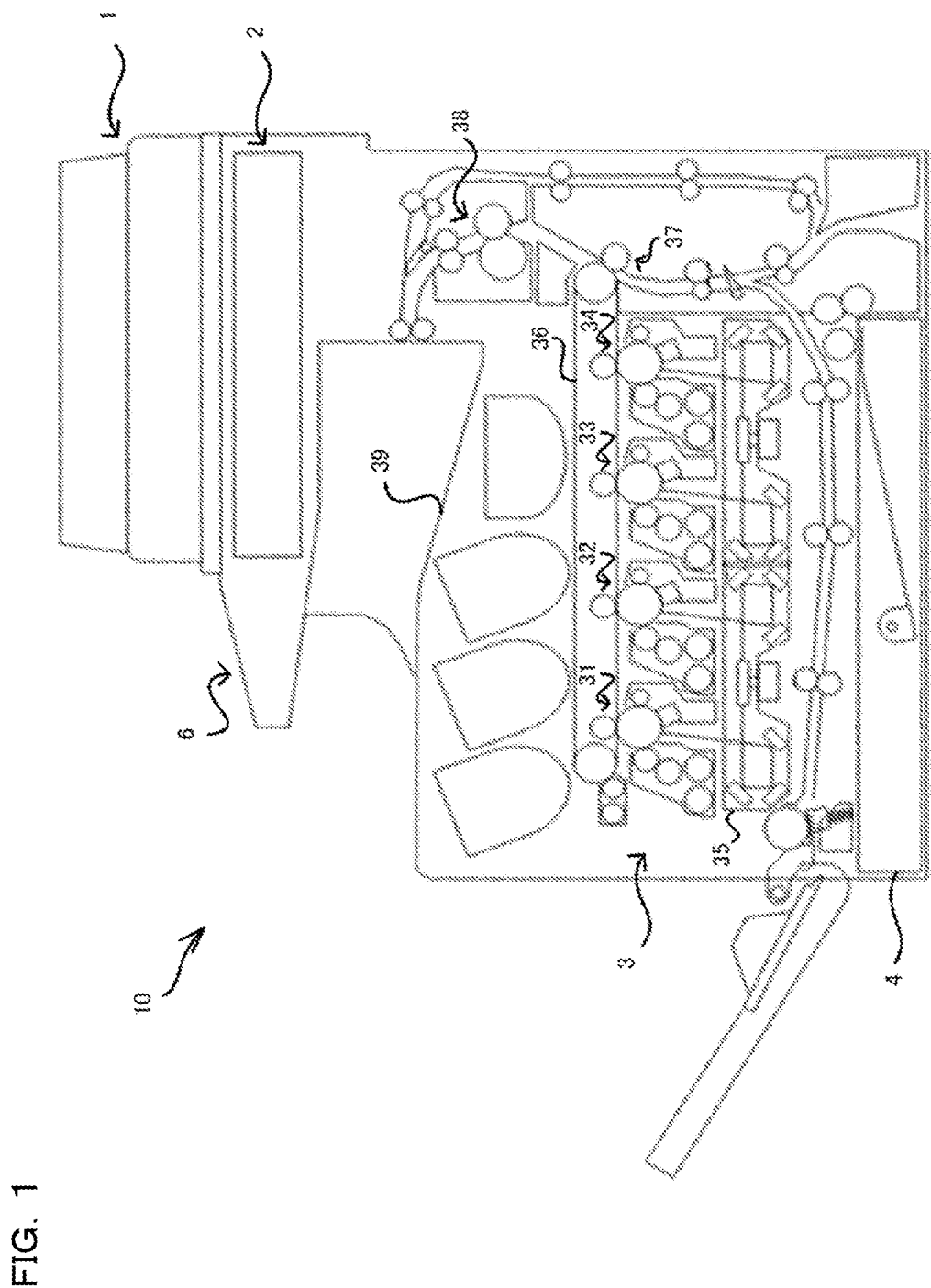
FIG. 1 is a schematic configuration diagram of an image forming apparatus according to an embodiment of the present disclosure.
Figure 2A:
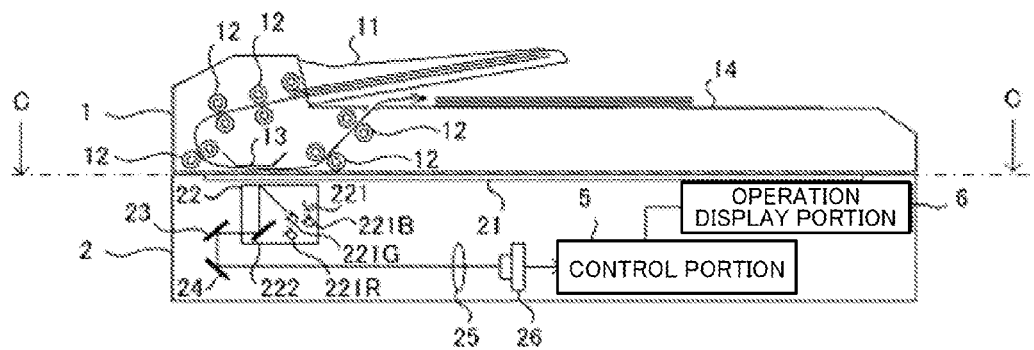
FIG. 2A and FIG. 2B are schematic configuration diagrams of an ADF and an image reading portion of the image forming apparatus according to the embodiment of the present disclosure.
Figure 2B:
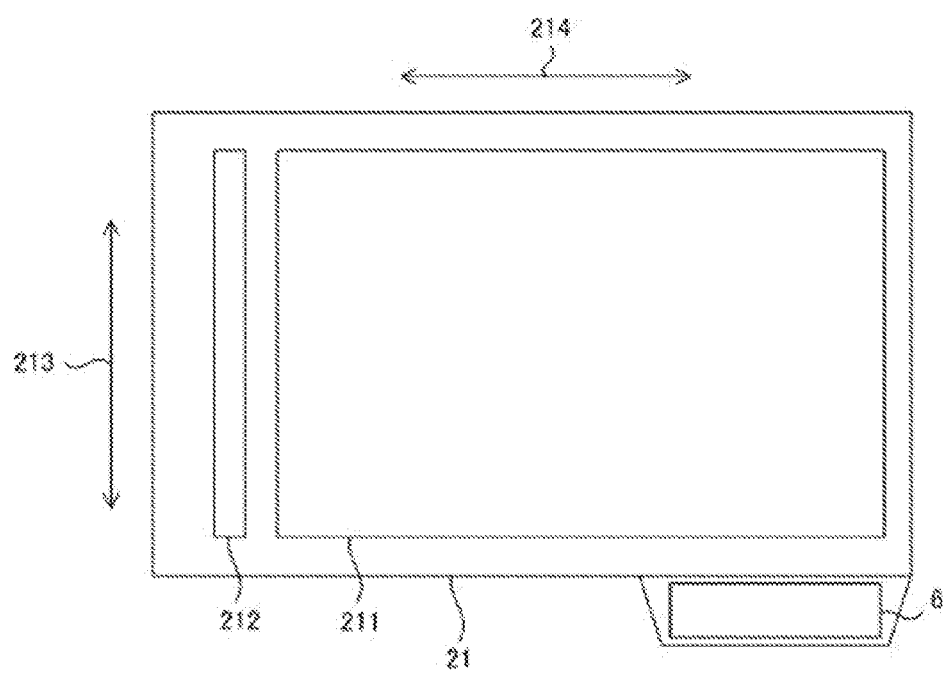
Figure 3:
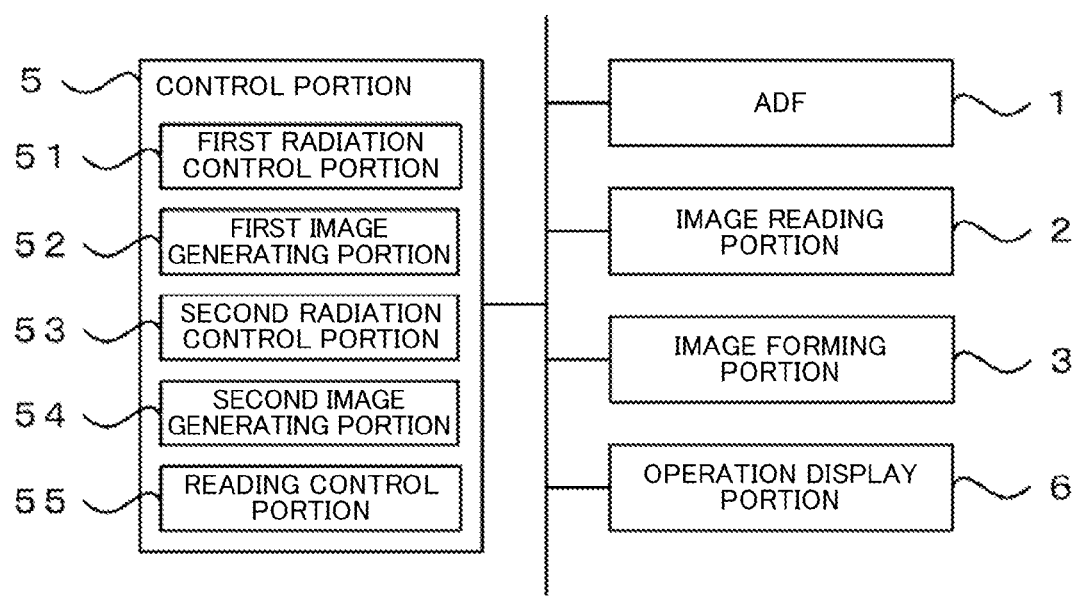
FIG. 3 is a block diagram showing the system configuration of the image forming apparatus according to the embodiment of the present disclosure.

As shown in FIG. 1 to FIG. 3, the image forming apparatus 10 includes the ADF 1, the image reading portion 2, an image forming portion 3, a sheet feed cassette 4, a control portion 5, and an operation display portion 6. The image forming apparatus 10 is a multifunction peripheral having a scan function of reading image data from a document and having a plurality of functions such as a printer function, a facsimile function, or a copy function. It is noted that in the image forming apparatus 10, a configuration including the image reading portion 2 and the control portion 5 is an example of the image reading device according to the present disclosure. In addition, the present disclosure is applicable to an image reading device or an image forming apparatus such as a scanner, a facsimile device, or a copy machine.

The image forming portion 3 is an image forming portion of electrophotographic type which executes color/monochrome image forming processing (print processing) based on image data read by the image reading portion 2 or image data inputted from an information processing device such as an external personal computer.

Specifically, as shown in FIG. 1, the image forming portion 3 includes a plurality of image forming units 31 to 34, an exposure device (LSU) 35, an intermediate transfer belt 36, a secondary transfer roller 37, a fixing device 38, and a sheet discharge tray 39. The image forming units 31 to 34 are image forming units of electrophotographic type for C (cyan), M (magenta), Y (yellow), and K (black), respectively. The image forming units 31 to 34 each include a photosensitive drum, a charging device, a developing device, a primary transfer roller, a cleaning device, and the like. The exposure device 35 radiates laser light based on image data to each photosensitive drum, thereby forming an electrostatic latent image based on the image data on each photosensitive drum. Then, a toner image for each color developed on each photosensitive drum by the developing device is intermediately transferred onto the intermediate transfer belt 36, and then is transferred onto a sheet fed from the sheet feed cassette 4, by the secondary transfer roller 37. Thereafter, the transferred toner image on the sheet is melted and fixed by the fixing device 38, whereby an image is formed, and then the sheet is discharged to the sheet discharge tray 39.

As shown in FIG. 2A, the ADF 1 is an automatic document feeder including a document set portion 11, a plurality of conveyance rollers 12, a document presser 13, and a sheet discharge portion 14. In the ADF 1, each conveyance roller 12 is driven by a motor (not shown), whereby a document placed on the document set portion 11 is conveyed through an image data reading position for the image reading portion 2 to the sheet discharge portion 14. Thus, the image reading portion 2 can read image data from a document conveyed by the ADF 1.

As shown in FIG. 2A and FIG. 2B, the image reading portion 2 includes a document table 21, a reading unit 22, mirrors 23 and 24, an optical lens 25, and a CCD (Charge Coupled Device) 26.

The document table 21 is located on an upper surface of the image reading portion 2, and as shown in FIG. 2B, includes a document placement surface 211 and a conveyance reading surface 212. The document placement surface 211 is a transparent contact glass on which a document as an image data reading target is placed. On the document placement surface 211, documents with various sizes can be placed in accordance with predetermined placement reference positions. The conveyance reading surface 212 is a conveyance reading glass that allows light radiated from the reading unit 22 to be transmitted to a document conveyed by the ADF 1.

As shown in FIG. 2A, the reading unit 22 includes a light source 221 and a mirror 222, and is movable in a sub scanning direction 214 by a movement mechanism (not shown) using drive means such as a stepping motor. While the reading unit 22 is moved in the sub scanning direction 214 by the movement mechanism, light radiated onto the document table 21 from the light source 221 scans in the sub scanning direction 214.

The light source 221 is an LED light source capable of radiating lights of R (red), G (green), and B (blue). Specifically, the light source 221 includes multiple red LEDs 221R arranged along a main scanning direction 213, multiple green LEDs 221G arranged along the main scanning direction 213, and multiple blue LEDs 221B arranged along the main scanning direction 213. It is noted that the light source 221 may include multiple full-color LEDs arranged along the main scanning direction 213, whose lights can be switched among R, G, and B.

When monochrome image data is read, the light source 221 radiates one line of white light along the main scanning direction 213 to a document through the document placement surface 211 or the conveyance reading surface 212 of the document table 21 by simultaneously lighting the LED light sources for all colors. When color image data is read, the light source 221 radiates lights in a plurality of colors for one line along the main scanning direction 213 to a document by sequentially lighting the LED light source for each color.

Here, the radiated position of light from the light source 221 is the image data reading position for the image reading portion 2, and the reading position is moved in the sub scanning direction 214 along with movement of the reading unit 22 in the sub scanning direction 214. Specifically, when reading image data from a document placed on the document placement surface 211, the reading unit 22 is moved to a position that allows light from the light source 221 to pass through the document placement surface 211. When reading image data from a document conveyed by the ADF 1, the reading unit 22 is moved to a position that allows light from the light source 221 to pass through the conveyance reading surface 212.

The mirror 222 reflects, toward the mirror 23, light radiated from the light source 221 and then reflected by the surface of a document present at the reading position on the document table 21. Then, the light reflected by the mirror 222 is guided into the optical lens 25 by the mirrors 23 and 24. The optical lens 25 converges light that has entered thereto from the mirror 24, into the CCD 26.

The CCD 26 is an image sensor having a photoelectric conversion element which converts received light to an electric signal (voltage) corresponding to the light amount and outputs the electric signal as image data for the color of the received light. When light of each color (R, G, and B) is radiated from the light source 221, the CCD 26 inputs, to the control portion 5, an electric signal based on light reflected from a document, as image data of the document (R data, G data, and B data). Here, the CCD 26 is an example of a photoelectric conversion portion.

The control portion 5 includes control devices such as a CPU, a ROM, a RAM, and an EEPROM (registered trademark), which are not shown. The CPU is a processor which executes various calculation processes. The ROM is a nonvolatile storage portion in which information such as a control program for causing the CPU to execute various processes is stored in advance. The RAM is a volatile storage portion, and the EEPROM is a nonvolatile storage portion. The RAM and the EEPROM are used as temporary storage memories (working areas) for various processes executed by the CPU. The control portion 5 executes various control programs stored in advance in the ROM by using the CPU, thereby performing overall control for the image forming apparatus 10. It is noted that the control portion 5 may be formed by an electronic circuit such as an integrated circuit (ASIC), or may be a control portion provided separately from a main control portion which performs overall control for the image forming apparatus 10.

Specifically, in the ROM or the EEPROM of the control portion 5, an image reading program for causing the CPU to execute an image reading process described later (see FIG. 5) is stored in advance. It is noted that the image reading program may be stored in a computer-readable storage medium such as a CD, a DVD, or a flash memory, and may be installed into a storage portion such as the EEPROM of the control portion 5 by being read from the storage medium.

The operation display portion 6 has a display portion such as a liquid crystal display for displaying various types of information in accordance with a control instruction from the control portion 5, and an operation portion such as a hardware key or a touch panel for inputting various types of information to the control portion 5 in accordance with a user's operation.

In the image forming apparatus 10, color image data can be read by using one CCD 26 based on reflected light obtained when lights of R (red), G (green), and B (blue) are radiated for every line to a document. However, in this case, a reading speed decreases as compared to a configuration in which color image data is read by using three line sensors for R, G, and B. On the other hand, as described below, in the image forming apparatus 10, when reading color image data using one CCD 26, it is possible to increase the reading speed while suppressing image quality reduction in the read image.

Specifically, as shown in FIG. 3, the control portion 5 includes a first radiation control portion 51, a first image generating portion 52, a second radiation control portion 53, a second image generating portion 54, and a reading control portion 55. It is noted that the control portion 5 executes the image reading program stored in the ROM by using the CPU, thereby functioning as the first radiation control portion 51, the first image generating portion 52, the second radiation control portion 53, the second image generating portion 54, and the reading control portion 55. In addition, some or all of the first radiation control portion 51, the first image generating portion 52, the second radiation control portion 53, the second image generating portion 54, and the reading control portion 55 may be electric circuit modules. Here, the first radiation control portion 51 is an example of a first radiation control portion, and the first image generating portion 52 is an example of a first image generating portion. In addition, the second radiation control portion 53 is an example of a second radiation control portion, and the second image generating portion 54 is an example of a second image generating portion. Further, the reading control portion 55 is an example of a reading control portion.

The second radiation control portion 53 sequentially radiates lights of R, G, and B from the light source 221 to each line along the main scanning direction 213 on a document. Specifically, when reading image data from a document placed on the document placement surface 211, the second radiation control portion 53, while sequentially switching the lighting color of the light source 221 with a predetermined period T, controls the movement speed of the reading unit 22 so that a time for the reading position to move by one line is 3T. In addition, when reading image data from a document conveyed by the ADF 1, the second radiation control portion 53, while sequentially switching the lighting color of the light source 221 with the period T, controls a driving speed (document conveyance speed) for the conveyance roller 12 of the ADF 1 so that a time for one line of the document to pass through the reading position is 3T. It is noted that the period T is a time set in advance in consideration of a light receiving time needed for the CCD 26 to output each of the electric signals corresponding to three color lights radiated to one line on a document.

The second image generating portion 54 generates color image data for one line, based on the electric signals corresponding to lights of R, G, and B radiated to each line by the second radiation control portion 53. Specifically, the second image generating portion 54 synthesizes R data, G data, and B data which are the electric signals corresponding to lights of R, G, and B radiated to each line, thereby generating color image data corresponding to the line.

The first radiation control portion 51 sequentially radiates two color lights of G and R or B from the light source 221 to each line along the main scanning direction 213 on a document, while alternately switching light of R and light of B on a line-by-line basis. In addition, the first radiation control portion 51 alternately radiates light of G and light of R or B from the light source 221 on a ½ line basis. Specifically, when reading image data from a document placed on the document placement surface 211, the first radiation control portion 51, while sequentially switching the lighting color of the light source 221 with the period T, controls the movement speed of the reading unit 22 so that a time for the reading position to move by one line is 2T. In addition, when reading image data from a document conveyed by the ADF 1, the first radiation control portion 51, while sequentially switching the lighting color of the light source 221 with the period T, controls a driving speed for the conveyance roller 12 of the ADF 1 so that a time for one line of the document to pass through the reading position is 2T. That is, the time during which light is radiated from light source 221 to one line on a document is 2T for the first radiation control portion 51, and is 3T for the second radiation control portion 53. Therefore, a scan time for a document by the first radiation control portion 51 is reduced to ⅔ as compared to the scan time for a document by the second radiation control portion 53.

The first image generating portion 52 generates color image data for one line, based on at least three electric signals corresponding to lights of R, G, and B, among the electric signals corresponding to the color lights radiated to at least adjacent two lines by the first radiation control portion 51. Specifically, the first image generating portion 52 generates color image data for one line, based on the electric signals corresponding to lights radiated in order of R, G, B, G, then R, or B, G, R, G, then B to adjacent three lines by the first radiation control portion 51.

Hereinafter, with reference to FIG. 4, a method for generating color image data by the first image generating portion 52 will be described. Here, in FIG. 4, R1, G1, B1, . . . represent respective color lights radiated while the lighting color is switched on a ½ line basis by the first radiation control portion 51.

Figure 4:
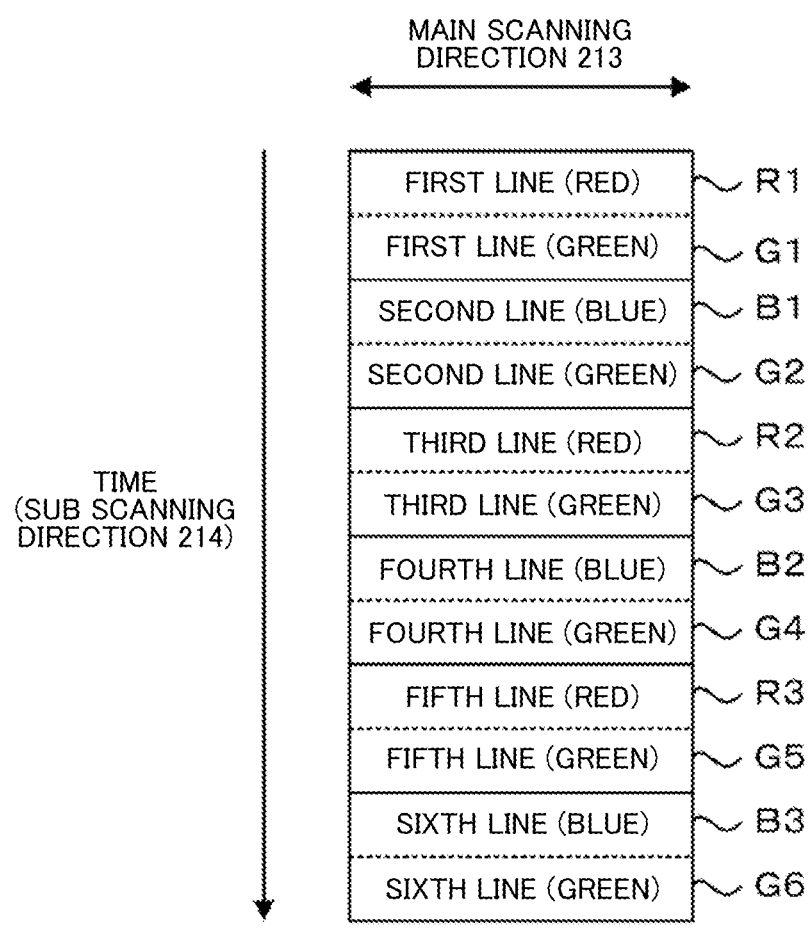
FIG. 4 is a diagram showing a condition of light radiation to each line on a document by a first radiation control portion of the image forming apparatus according to the embodiment of the present disclosure.

First, when radiation lights R1, G1, B1, G2, and R2 shown in FIG. 4 are radiated by the first radiation control portion 51, the first image generating portion 52 generates color image data corresponding to the second line. Specifically, the first image generating portion 52 acquires an average value between R data corresponding to the radiation light R1 and R data corresponding to the radiation light R2. Thus, R data for the radiation position of the radiation light B1 which corresponds to the middle between the radiation position of the radiation light R1 and the radiation position of the radiation light R2 is obtained. In addition, the first image generating portion 52 acquires an average value between G data corresponding to the radiation light G1 and G data corresponding to the radiation light G2. Thus, G data for the radiation position of the radiation light B1 which corresponds to the middle between the radiation position of the radiation light G1 and the radiation position of the radiation light G2 is obtained. Then, the first image generating portion 52 synthesizes B data corresponding to the radiation light B1 and the R data and the G data for the radiation position of the radiation light B1, thereby generating color image data corresponding to the second line. Next, when radiation light G3 and radiation light B2 are radiated, the second image generating portion 52 synthesizes an average value of B data corresponding to the radiation light B1 and the radiation light B2, an average value of G data corresponding to the radiation light G2 and the radiation light G3, and R data corresponding to the radiation light R2, thereby generating color image data corresponding to the third line. Then, the second image generating portion 52 generates color image data for the fourth and subsequent lines, in the same manner as for the second and third lines.

It is noted that a method for acquiring the R data for the radiation position of the radiation light B1 when the first image generating portion 52 generates color image data corresponding to the second line is not limited to calculation of an average value between R data corresponding to the radiation light R1 and R data corresponding to the radiation light R2. For example, the first image generating portion 52 may calculate a weighted average based on a predetermined value, between R data corresponding to the radiation light R1 and R data corresponding to the radiation light R2. The same applies to the case where the first image generating portion 52 acquires G data for the radiation position of the radiation light B1. In addition, in the case where the first image generating portion 52 reads color image data corresponding to the second line using a position different from the radiation position of the radiation light B1 as a reading position for the color image data, the weighting of the weighted average may be set based on the distance from the different position to each of the radiation positions of the radiation light R1 and the radiation light R2.

Thus, the first image generating portion 52 reads color image data based on reflected light obtained when two color lights of R and G or B and G are radiated per line to a document. Therefore, the colorfulness reproducibility of the color image data generated by the first image generating portion 52 decreases because of lack of R data or B data corresponding to each line, as compared to color image data generated by the second image generating portion 54.

However, in human sense, it is known that sensitivity to brightness is higher than sensitivity to colorfulness. Even if the colorfulness reproducibility slightly reduces, deterioration in an image quality perceived by a human is suppressed as long as brightness reproducibility is maintained. According to a known conversion equations for converting RGB data composing color image data into YUV data as shown in (1) to (3) below, the ratio of G data in Y (brightness) is obviously higher than the ratios of R data and B data. In the color image data generated by the first image generating portion 52, the brightness reproducibility is maintained by G data being acquired for every line, and in addition, lack of R data or B data corresponding to each line alternately appears on a line-by-line basis, whereby deterioration in image quality is minimized.

$$Y = 0.299R + 0.587G + 0.114B \quad (1)$$

$$U = -0.147R - 0.289G + 0.436B \quad (2)$$

$$V = 0.615R - 0.515G - 0.100B \quad (3)$$

Further, the first image generating portion 52 generates color image data for one line, based on the electric signals corresponding to lights of R, G, B, G, and R or lights of B, G, R, G, and B radiated to adjacent three lines. Therefore, displacement of the radiation position of each color light radiated while the lighting color is switched on a ½ line basis by the first radiation control portion 51 is corrected in the reading of color image data. Thus, the color reproducibility of color image data generated by the first image generating portion 52 is enhanced.

The reading control portion 55 is capable of switching a reading mode between a high-speed reading mode in which a reading operation for color image data is executed by using the first radiation control portion 51 and the first image generating portion 52, and a normal reading mode in which a reading operation for color image data is executed by using the second radiation control portion 53 and the second image generating portion 54. It is noted that the reading control portion 55 is capable of selectively executing the high-speed reading mode or the normal reading mode in accordance with a user's setting operation on a reading setting screen displayed on the operation display portion 6 at the time of initial setting of the image forming apparatus 10 or reading setting of the image forming apparatus 10.

[Image Reading Process]

Figure 5:
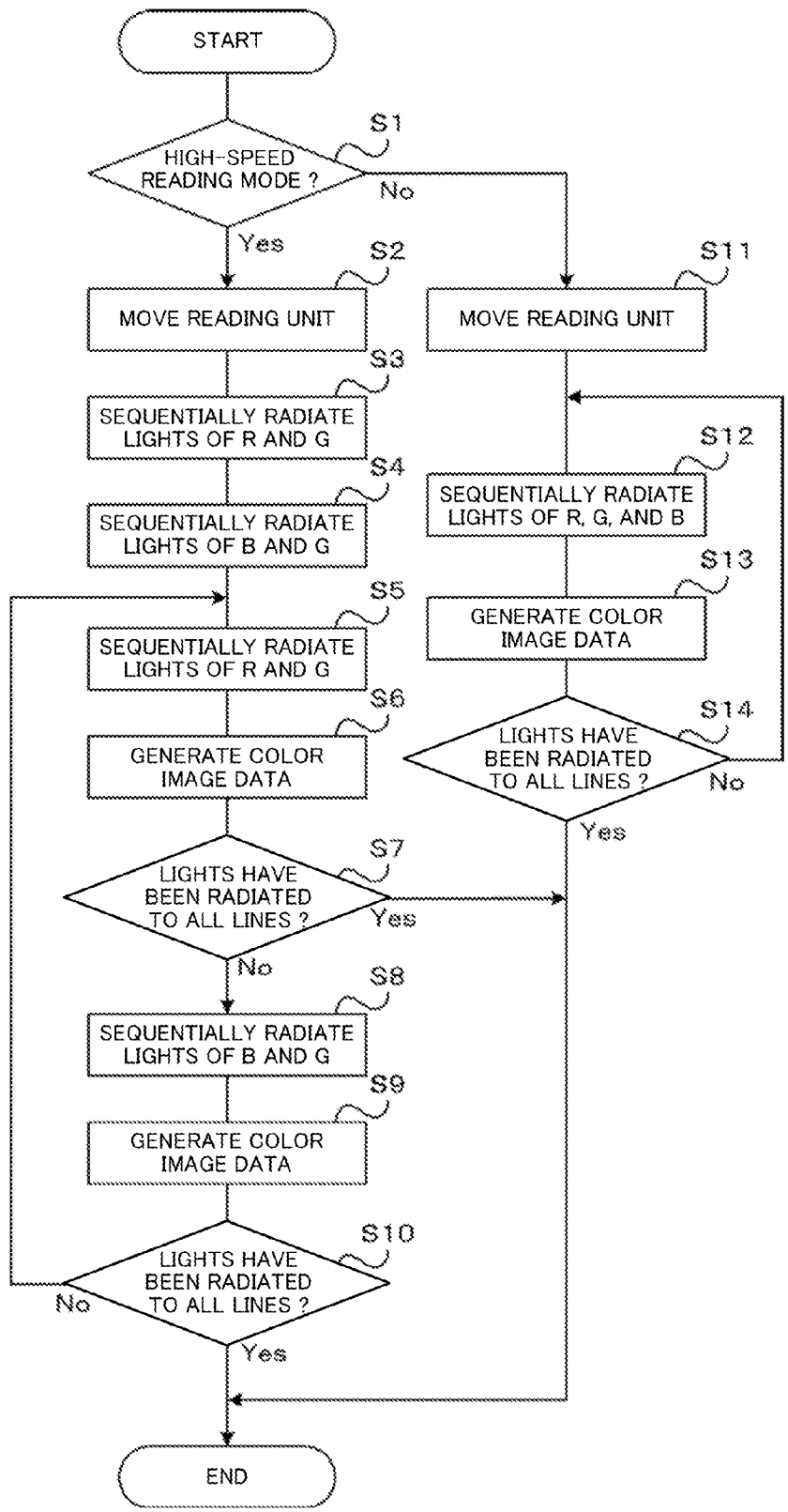
FIG. 5 is a flowchart showing an example of an image reading process executed by the image forming apparatus according to the embodiment of the present disclosure.

Hereinafter, with reference to FIG. 5, an example of the procedure of the image reading process executed by the control portion 5 in the image forming apparatus 10 will be described. Here, steps S1, S2, . . . represent the numbers of steps of the process executed by the control portion 5. A method including the steps of the image reading process executed by the control portion 5 is an example of the image reading method according to the present disclosure. For example, the control portion 5 executes the image reading process when a user performs an operation to execute the reading process for a color image on the operation display portion 6, or when the control portion 5 receives an execution request from an information processing device connected to the image forming apparatus 10. In the following description, an example in which image data is read from a document placed on the document placement surface 211 will be shown. However, the same process is executed even in the case of reading image data from a document conveyed by the ADF 1.

<Step S1>

First, in step S1, the reading control portion 55 determines whether or not the high-speed reading mode is set as a reading mode for color image data for the image reading portion 2.

Here, if the reading control portion 55 determines that the high-speed reading mode is set as the reading mode (Yes in S1), the reading control portion 55 shifts the process to step S2 to perform the reading process by the high-speed reading mode. On the other hand, if the reading control portion 55 determines that the high-speed reading mode is not set as the reading mode (No in S1), the reading control portion 55 shifts the process to step S11 to perform the reading process by the normal reading mode.

<Step S11>

Here, processing in the case where the reading process is executed in the normal reading mode will be described. Specifically, in step S11, the second radiation control portion 53 moves the reading unit 22 in the sub scanning direction 214 from a home position. Here, the second radiation control portion 53 controls the movement speed of the reading unit 22 so that a time for the reading position to move by one line is three times (3T) the period T which is the switching period of the lighting color of the light source 221.

<Step S12>

In step S12, the second radiation control portion 53 sequentially radiates lights of R, G, and B to one line along the main scanning direction 213 on a document. Specifically, along with the movement of the reading unit 22 by the one line, the second radiation control portion 53, first, lights the red LED 221R during the period T, next, lights the green LED 221G during the period T, and finally, lights the blue LED 221B during the period T.

<Step S13>

In step S13, the second image generating portion 54 generates color image data corresponding to the line to which the lights are radiated in step S12, based on R data, G data, and B data corresponding to the lights radiated in step S12. Specifically, the second image generating portion 54 synthesizes R data, G data, and B data outputted from the CCD 26, thereby generating color image data.

<Step S14>

In step S14, the control portion 5 determines whether or not the lights have been radiated to all the lines on the document by the second radiation control portion 53.

Here, if the control portion 5 determines that the lights have been radiated to all the lines on the document by the second radiation control portion 53 (Yes in S14), the control portion 5 ends the image reading process. On the other hand, if the control portion 5 determines that the lights have not been radiated to all the lines on the document by the second radiation control portion 53 (No in S14), the control portion 5 returns the process to step S12 to continue the reading of color image data.

<Step S2>

On the other hand, if it is determined that the high-speed reading mode is set as the reading mode (Yes in S1), the control portion 5 executes processing of step S2 and the subsequent steps. First, in step S2, the first radiation control portion 51 moves the reading unit 22 in the sub scanning direction 214 from the home position. Here, the first radiation control portion 51 controls the movement speed of the reading unit 22 so that a time for the reading position to move by one line is two times (2T) the period T which is the switching period of the lighting color of the light source 221. Thus, the movement speed of the reading unit 22 in the high-speed reading mode is 3/2 of the movement speed of the reading unit 22 in the normal reading mode. Therefore, the reading speed for color image data in the high-speed reading mode is 3/2 of the reading speed for color image data in the normal reading mode.

<Step S3>

In step S3, the first radiation control portion 51 sequentially radiates lights of R and G to one line along the main scanning direction 213 on a document. Specifically, along with the movement of the reading unit 22 by the one line, the first radiation control portion 51 lights the red LED 221R during the period T and then lights the green LED 221G during the period T.

<Step S4>

In step S4, the first radiation control portion 51 sequentially radiates lights of B and G to the next one line. Specifically, along with the movement of the reading unit 22 by the one line, the first radiation control portion 51 lights the blue LED 221B during the period T and then lights the green LED 221G during the period T.

<Step S5>

In step S5, the first radiation control portion 51 sequentially radiates lights of R and G to the next one line. Specifically, along with the movement of the reading unit 22 by the one line, the first radiation control portion 51 lights the red LED 221R during the period T and then lights the green LED 221G during the period T.

<Step S6>

In step S6, the first image generating portion 52 generates color image data corresponding to the line that is one line before the line to which the lights are radiated in step S5, based on R data corresponding to the light radiated in step S5, B data and G data corresponding to the lights radiated to the line that is one line before the line to which the lights are radiated in step S5, and R data and G data corresponding to the lights radiated to the line that is two lines before the line to which the lights are radiated in step S5. Specifically, the first image generating portion 52 synthesizes an average value between the two acquired R data, an average value of the two acquired G data, and the acquired B data, thereby generating color image data.

<Step S7>

In step S7, the control portion 5 determines whether or not the lights have been radiated to all the lines on the document by the first radiation control portion 51, as in step S14.

Here, if the control portion 5 determines that the lights have been radiated to all the lines on the document by the first radiation control portion 51 (Yes in S7), the control portion 5 ends the image reading process. On the other hand, if the control portion 5 determines that the lights have not been radiated to all the lines on the document by the first radiation control portion 51 (No in S7), the control portion 5 shifts the process to step S8 to continue the reading of color image data.

<Step S8>

In step S8, the first radiation control portion 51 sequentially radiates lights of B and G to the next one line. Specifically, along with the movement of the reading unit 22 by the one line, the first radiation control portion 51 lights the blue LED 221B during the period T and then lights the green LED 221G during the period T.

<Step S9>

In step S9, the first image generating portion 52 generates color image data, as in step S6. That is, the first image generating portion 52 generates color image data corresponding to the line that is one line before the line to which the lights are radiated in step S8, based on B data corresponding to the light radiated in step S8, R data and G data corresponding to the lights radiated to the line that is one line before the line to which the lights are radiated in step S8, and B data and G data corresponding to the lights radiated to the line that is two lines before the line to which the lights are radiated in step S8. Specifically, the first image generating portion 52 synthesizes an average value of the two acquired B data, an average value of the two acquired G data, and the acquired R data, thereby generating color image data.

<Step S10>

In step S10, the control portion 5 determines whether or not the lights have been radiated to all the lines on the document by the first radiation control portion 51, as in step S7.

Here, if the control portion 5 determines that the lights have been radiated to all the lines on the document by the first radiation control portion 51 (Yes in S10), the control portion 5 ends the image reading process. On the other hand, if the control portion 5 determines that the lights have not been radiated to all the lines on the document by the first radiation control portion 51 (No in S10), the control portion 5 shifts the process to step S5 to continue the reading of color image data.

As described above, in the image forming apparatus 10, in the case where the high-speed reading mode is set, in the image reading process, two color lights are sequentially radiated to each line along the main scanning direction 213 on a document, to read color image data. Therefore, in the image forming apparatus 10, the reading speed for color image data in the case where the high-speed reading mode is set is 3/2 of the reading speed for color image data in the case where the normal reading mode is set. In addition, in the high-speed reading mode, while G data is always acquired from each line along the main scanning direction 213 on a document, R data and B data are alternately acquired on a line-by-line basis. Therefore, the degree of deterioration in the image quality of color image data read in the high-speed reading mode relative to the image quality of color image data read in the normal reading mode is minimized.

It is noted that the reading process for color image data in the high-speed reading mode cannot generate color image data corresponding to the first one line and the last one line. Therefore, the first image generating portion 52 may load predetermined default data as data for a line that is one line before the first one line, thereby generating color image data corresponding to the first one line. Similarly, the first image generating portion 52 may load predetermined default data as data for a line corresponding to the line next to the last one line, thereby generating color image data corresponding to the last one line.

In the reading process for color image data in the high-speed reading mode, among image data for three colors composing color image data read for one line, average values are calculated for two colors but an average value is not calculated for the other one color. Therefore, as compared to the image data for the two colors for which average values are calculated, the image data for the other one color is relatively clearly represented. Therefore, in another embodiment, in the high-speed reading mode of the image forming apparatus 10, color image data may be read based on image data for five lines.

Specifically, in FIG. 4, when reading color image data for the fourth line, the first image generating portion 52 may calculate a weighted average among B data corresponding to the radiation light B2, B data corresponding to the radiation light B1, and B data corresponding to the radiation light B3. Here, the weighting for each B data in the weighted average is set based on the distance from the radiation position of the radiation light B2 which is the reading position for color image data to each of the radiation positions of the radiation light B2, the radiation light B1, and the radiation light B3. It is noted that the weighted average among these B data may be calculated based on a predetermined value. The first image generating portion 52 synthesizes the calculated weighted average among B data, an average value of R data corresponding to the radiation light R2 and the radiation light R3, and an average value of G data corresponding to the radiation light G3 and the radiation light G4, thereby generating color image data for one line. Thus, in the color image data read in the high-speed reading mode of the image forming apparatus 10, relatively clear representation for only one color as compared to the other two colors is suppressed. In this case, since all of the image data for three colors composing the color image data are blurred, it is desirable to perform image correcting processing such as edge emphasizing processing for the read color image data.

Other Embodiments

In the above embodiment, the first image generating portion 52 reads color image data based on image data for three lines in order to correct displacement of the radiation position of each color light radiated while the lighting color is switched on a ½ line basis by the first radiation control portion 51. On the other hand, the first image generating portion 52 may omit the correction of displacement of the radiation position of each light, to reduce processing load on the first image generating portion 52.

Specifically, the first image generating portion 52 may generate color image data for one line, based on the electric signals corresponding to lights radiated in order of R, G, then B, or B, G, then R to adjacent two lines by the first radiation control portion 51.

Here, with reference to FIG. 4, a method for generating color image data executed by the first image generating portion 52 according to the other embodiment will be described. First, when the radiation lights R1, G1, and B1 shown in FIG. 4 are radiated by the first radiation control portion 51, the first image generating portion 52 generates color image data corresponding to the first line. Specifically, the first image generating portion 52 synthesizes R data corresponding to the radiation light R1, G data corresponding to the radiation light G1, and B data corresponding to the radiation light B1, which are outputted from the CCD 26, thereby generating color image data for the first line. Next, when the radiation lights G2 and R2 are radiated, the second image generating portion 52 synthesizes B data corresponding to the radiation light B1, G data corresponding to the radiation light G2, and R data corresponding to the radiation light R2, thereby generating color image data for the second line. Then, the second image generating portion 52 generates color image data for the third and subsequent lines, in the same manner as for the first and second lines.

Thus, in the first image generating portion 52 according to the other embodiment, color image data is generated based on image data for two colors including G data and R data or B data for one line, and image data for two colors including B data or R data for the next line adjacent to the one line. Therefore, it is not necessary to calculate an average value of R data and an average value of B data using image data for three lines as described in the above embodiment. Therefore, processing load on the first image generating portion 52 in the high-speed reading mode is reduced.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a light source configured to radiate lights of R (red), G (green), and B (blue);
a photoelectric conversion portion configured to receive light reflected from a document and output an electric signal corresponding to a light reception amount;
a first radiation control portion configured to sequentially radiate lights in two colors of G and R or B from the light source to each line along a main scanning direction on the document while alternately switching the light of R and the light of B on a line-by-line basis; and
a first image generating portion configured to generate color image data for one line, based on at least three electric signals corresponding to lights of R, G, and B among the electric signals corresponding to lights in respective colors radiated to at least adjacent two lines by the first radiation control portion, wherein
the first radiation control portion alternately radiates light of G and light of R or B on a ½ line basis from the light source, and
the first image generating portion generates color image data for one line, based on the electric signals corresponding to lights radiated in an order of R, G, then B, or B, G, then R to adjacent two lines by the first radiation control portion.

2. An image reading device comprising:
a light source configured to radiate lights of R (red), G (green), and B (blue);
a photoelectric conversion portion configured to receive light reflected from a document and output an electric signal corresponding to a light reception amount;
a first radiation control portion configured to sequentially radiate lights in two colors of G and R or B from the light source to each line along a main scanning direction on the document while alternately switching the light of R and the light of B on a line-by-line basis; and
a first image generating portion configured to generate color image data for one line, based on at least three electric signals corresponding to lights of R, G, and B among the electric signals corresponding to lights in respective colors radiated to at least adjacent two lines by the first radiation control portion, wherein
the first radiation control portion alternately radiates light of G and light of R or B on a ½ line basis from the light source, and the first image generating portion generates color image data for one line, based on the electric signals corresponding to lights radiated in an order of R, G, B, G, then R, or B, G, R, G, then B to adjacent three lines by the first radiation control portion.

3. An image reading device comprising:

a light source configured to radiate lights of R (red), G (green), and B (blue);

a photoelectric conversion portion configured to receive light reflected from a document and output an electric signal corresponding to a light reception amount;

a first radiation control portion configured to sequentially radiate lights in two colors of G and R or B from the light source to each line along a main scanning direction on the document while alternately switching the light of R and the light of B on a line-by-line basis;

a first image generating portion configured to generate color image data for one line, based on at least three electric signals corresponding to lights of R, G, and B among the electric signals corresponding to lights in respective colors radiated to at least adjacent two lines by the first radiation control portion;

a second radiation control portion configured to sequentially radiate lights of R, G, and B from the light source to each line along the main scanning direction on the document;

a second image generating portion configured to generate color image data for one line, based on the electric signals corresponding to the lights of R, G, and B radiated to the line by the second radiation control portion; and a reading control portion configured to perform switching between a reading operation for color image data using the first radiation control portion and the first image generating portion, and a reading operation for color image data using the second radiation control portion and the second image generating portion.

4. An image forming apparatus comprising:

the image reading device according to claim 2; and an image forming portion configured to form an image based on image data read by the image reading device.

5. An image reading method executed by an image reading device that includes a light source configured to radiate lights of R (red), G (green), and B (blue), and a photoelectric conversion portion configured to receive light reflected from a document and output an electric signal corresponding to a light reception amount, the image reading method comprising:

a first step of sequentially radiating lights in two colors of G and R or B from the light source to each line along a main scanning direction on the document while alternately switching the light of R and the light of B on a line-by-line basis; and a second step of generating color image data for one line, based on at least three electric signals corresponding to lights of R, G, and B among the electric signals corresponding to lights in respective colors radiated to at least adjacent two lines in the first step, wherein in the first step, light of G and light of R or B are alternately radiated on a ½ line basis from the light source, and in the second step, color image data from one line is generated based on the electric signals corresponding to lights radiated in an order of R, G, B, G, then R, or B, G, R, G, then B to adjacent three lines by the first step.

* * * * *